Patented Jan. 2, 1940

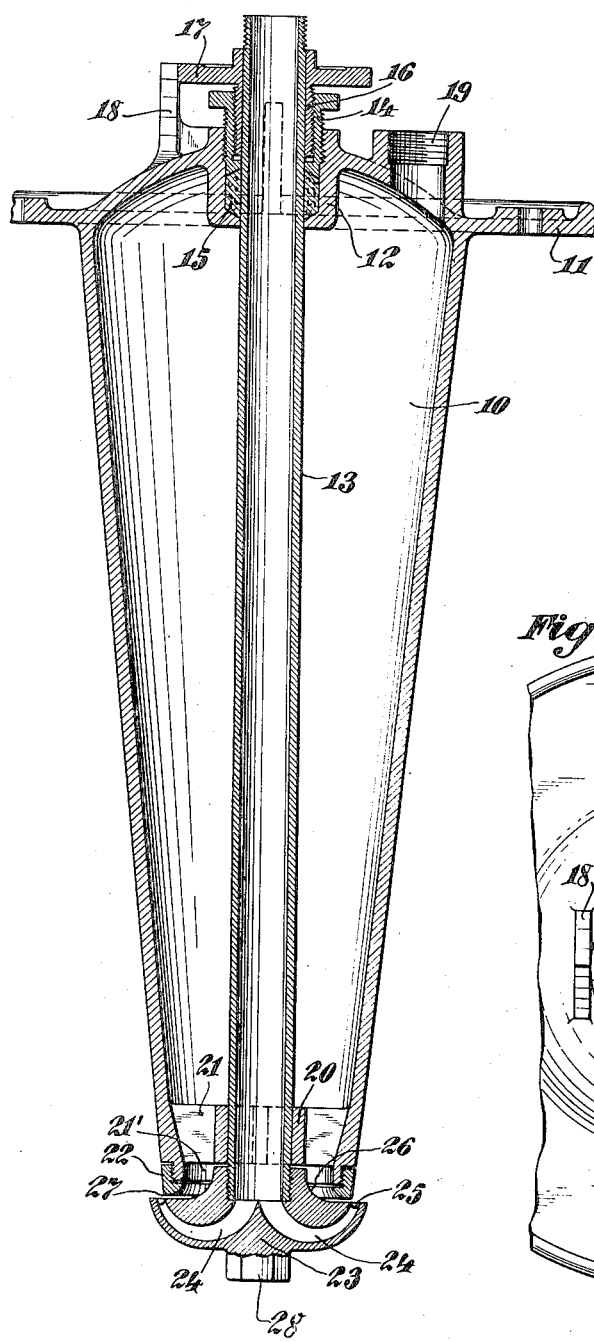
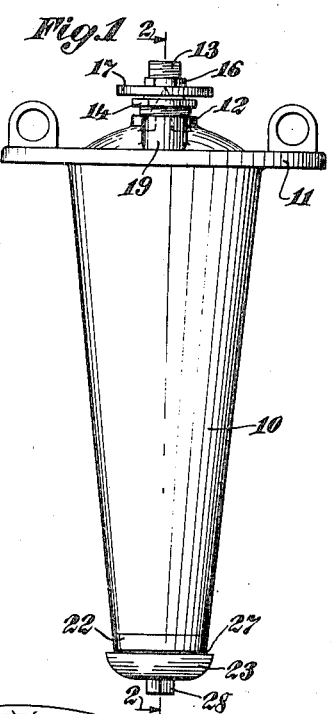
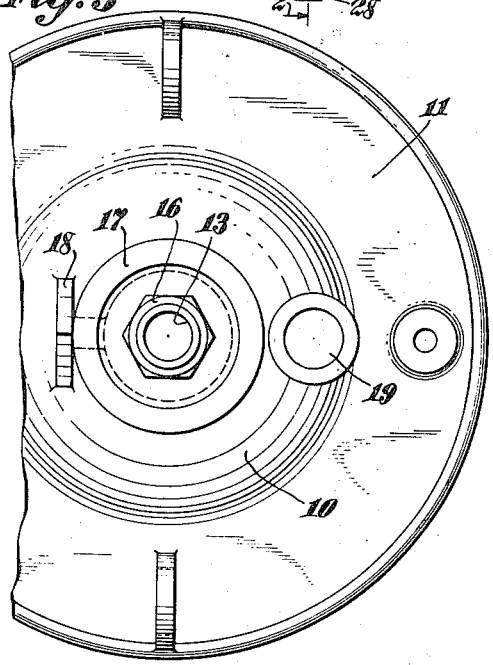

2,185,369

UNITED STATES PATENT OFFICE 2,185,369

ATOMIZER DEVICE

William Spencer Bowen, Westfield, N. J.

Application February 26, 1938, Serial No. 192,869

9 Claims. (Cl. 299—141)

This invention relates to atomizers and, more particularly, to an apparatus for reducing fluid suspensions to a finely divided state in order that the suspended substances may be effectively removed from the fluids in which they are suspended.

Solids may be effectively removed from the fluids in which they are suspended by spray drying processes in which the fluid suspension is reduced to a finely divided state, and air or other gas is brought into contact with the material so that the moisture entrained in the suspended solids is rapidly evaporated. In this manner, it is possible to obtain a solid product of low moisture content in the form of a fine powder.

Great difficulty has been experienced, however, in adapting this process satisfactorily to some fluid suspensions, particularly those which react chemically with or are altered physically by air. Blood, for example, has the property of coagulating in the presence of air. It has been found in spray drying blood that it tends to coagulate in the spray nozzle at the point where it comes into contact with air, causing the supply passages to become clogged with coagulated blood. The apparatus then must be shut down to allow the nozzles to be cleaned and as a result the operation of the apparatus is inefficient and yield of the dried product is low.

It has further been found that the loss of heat from the fluid due to radiation and conduction from the outer walls of the feed line to the nozzle increases the tendency of the blood to coagulate in the nozzle passages.

An object of the invention, accordingly, is to provide an improved non-clogging apparatus for rapidly and effectively reducing fluids in which solid substances are suspended to a finely divided state.

Another object of the invention is to provide an apparatus of the above character in which the fluids are reduced to a finely divided state by means of gas, such as for example, air or steam under pressure before chemical or physical change can take place in the fluid.

Another object of the invention is to provide a fluid atomizing apparatus in which the atomizing gas serves to insulate the conduit through which the fluid is conducted to the nozzle.

In a preferred embodiment of the invention, the fluid is fed through a conduit about which a pressure chamber is formed which is supplied with air, steam or other suitable inert gas such as, for example, nitrogen, under pressure. The lower portion of the chamber is provided with an opening which is partially closed by a feed device for the fluid or nozzle secured at the lower extremity of the conduit. Fluid is fed from the conduit to a trough in the nozzle over which gas at high velocity is passed from the outlet formed by the adjacent surfaces of the nozzle and the opening in the pressure chamber. With this construction, the fluid rises from the trough in the form of a column which is immediately dispersed by the high velocity gas from the outlet. The gas in the pressure chamber forms an insulating medium for the fluid in the conduit so that its temperature may be carefully controlled and the escape of heat therefrom effectively prevented, and the tendency of the fluid to coagulate, therefore, is reduced to a minimum.

Additional objects will be apparent from the following detailed description taken in connection with the accompanying drawing, in which:

Figure 1 is a view in elevation illustrating an atomizer constructed in accordance with this invention;

Figure 2 is a view in vertical section taken through line 2—2 of Figure 1, looking in the direction of the arrows; and Figure 3 is a partial view in plan of the atomizer shown in Figure 1.

Referring to the drawing, an atomizer is shown which comprises an elongated tapered pressure chamber 10 on which a flange 11 is formed by means of which it may be held in position when in use.

In the upper portion of the pressure chamber 10 a sleeve 12 is formed which is adapted to receive a conduit through which fluid may be fed to an atomizing nozzle. The inner periphery of the sleeve 12 is threaded to receive a gland member 14 which cooperates with the packing 15 to form an airtight joint at the point where the conduit 13 enters the chamber 10. The inner diameter of the gland member 14 may be made somewhat larger than the outer diameter of the feed pipe 13 so that an annular space exists in which a bushing 16 may be received. The inner surface of the gland member 14 is threaded to receive the bushing 16 which is shrunk on the feed pipe 13 and which is provided with a disc 17 whereby the feed pipe 13 may be rotated about its axis. A lug 18 is formed on the upper portion of the pressure chamber which is adapted to register with calibrated divisions on the disc 17 to indicate the position of the nozzle as is described below, and an inlet 19 is formed in the pressure chamber through which gas under pressure may be admitted thereto.

In the lower portion of the pressure chamber 10 is an annular collar 20 in which the lower portion of the conduit 13 is adapted to be received, and which is secured to the chamber by means of the radially extending ribs 21. This collar 20, in conjunction with the sleeve 15, serves to position the conduit 13 so that it is supported centrally at the axis of the pressure chamber 10. The lower extremity of the pressure chamber 10 is provided with an opening 21' and is threaded to receive a nut 22 whose inner surface is streamlined to provide a path of low resistance for gas passing from the pressure chamber 10.

The lower extremity of the conduit 13 is threaded to receive the nozzle 23 in which a plurality of crescent or arc-shaped radially directed passages 24 are formed. These passages serve to direct the fluid upwardly to an annular trough 25 which is formed adjacent the outer edge of the nozzle 23. The upper surface of the nozzle 23 is provided with suitably curved portions 26 which provide a streamlined path for the gas from the pressure chamber 10 to the annular outlet 27 formed by the adjacent edges of the nut 22 and the nozzle 23. The dimensions of the nut 22 and the nozzle 23 are so chosen that when the annular outlet 27 is completely closed the outer edge of the nut 22 will register with the inner edge of the annular trough 25. With this construction it is evident that when the outlet 27 is open, gas from the pressure chamber 10 will be directed outwardly across the surface of the trough 25, drawing with it the fluid contained therein and thus reducing it to a finely divided state.

In operation, the fluid is fed in at the upper end of the feed pipe 13 and gas under pressure is supplied to the pressure chamber 10 through the inlet 19. It will be noted that by rotating the flange 17 the feed pipe 13 may be raised or lowered to adjust the nozzle 23. If the annular outlet 27 is initially closed, it may be opened by rotating the flange 17 in a counter-clockwise direction to lower the nozzle 23. As the nozzle 23 moves downwardly, the annular gas outlet 27 opens and the gas under pressure is directed across the upper surface of the annular trough 25 to which the fluid is fed from the feed pipe 13. An annular column of fluid rises in the trough 25 through which gas at high velocity is directed so that the fluid is carried away from the nozzle in an extremely finely divided state and at a very rapid rate. Thus, by providing gas at a sufficiently high degree of velocity, a fluid such as blood can be carried away from the annular trough 25 at such a rapid rate that it will not be in contact with the gas in the nozzle for a sufficient length of time to coagulate in the nozzle passages.

Furthermore, the presence of gas between the pressure chamber 10 and the feed pipe 13 prevents any escape of heat from the fluid, since the gas itself is a good heat insulator. The fluid therefore maintains an even temperature right up to the point where it is discharged from the nozzle and it is atomized so rapidly that the fluid passages do not become clogged up, due to the coagulation of the fluid contained therein.

A hexagonal nut 28 is formed on the lower portion of the nozzle 23 by means of which it may be readily removed from the feed pipe 13 and cleaned when necessary. Similarly, the nut 22 on the lower extremity of the chamber 10 can easily be unscrewed to remove any material which may have collected on its surface after a long period of operation.

It is evident from the foregoing that this invention provides an atomizing apparatus by means of which solids may be rapidly and effectively removed from the substances in which they are suspended without clogging the fluid passages in the nozzle. Furthermore, it provides an improved atomizer in which the temperature of the fluid may be effectively controlled right up to the point of ejection from the nozzle.

This improved atomizer may obviously be used to advantage for atomizing fluid suspensions other than blood. For example, it has been found very effective in the spray drying of treated sewage and other similar substances where difficulty is experienced due to clogging of the spray nozzle. It is intended, therefore, that all such uses are to be considered within the scope of this invention.

It is to be understood that the above description is given only by way of illustration and the invention is not intended to be in any way limited thereby, except as defined in the following claims.

I claim:

1. In an atomizing device, a fluid nozzle comprising a head, a hub in the head disposed centrally thereof and having a fluid passage formed therein, the said head having a curved surface diverging downwardly from the said hub to a plane surface perpendicular to the axis of the hub, an annular trough adjacent the edge of the said plane surface, means in the head forming passages for directing fluid from the passage in the hub to the said trough, and means immediately adjacent the said trough for directing gas outwardly across the said trough, whereby the fluid may be removed from the trough in a finely divided state.

2. An atomizing device comprising a pressure chamber having an opening therein, means to supply gas under pressure to the said pressure chamber, a conduit in the chamber extending substantially into and disposed centrally of the said opening, means to supply fluid to the said conduit, a fluid nozzle on the conduit, the said nozzle comprising a head, a hub on the head disposed centrally thereof and having a fluid passage therein, means on the head forming a plane surface extending radially of the hub and cooperating with the edge of the said opening to form an annular gas outlet, an annular trough in the head between and immediately adjacent the edge of the said plane surface and the said air outlet, and means in the head for supplying fluid from the passage in the hub to the said trough, whereby gas under pressure may be directed over the said trough for reducing the fluid to a finely divided state.

3. An atomizing device comprising a pressure chamber having an opening therein, the said opening having a narrow throat portion diverging to a wide mouth portion forming a streamline surface, means to supply gas to the said pressure chamber, a conduit in the chamber extending substantially into and disposed centrally of the said opening, means to supply fluid to the said conduit, a fluid nozzle on the conduit, the said nozzle comprising a head having a hub formed centrally thereon provided with a fluid passage, the said head having a curved surface diverging downwardly from the said hub to a plane surface to cooperate with the streamline surface of the said pressure chamber opening to form a downwardly converging passage terminating in an annular air outlet, an annular trough in the head located between and immediately adjacent the edge of the said plane surface and the said annular outlet, and means in the head providing a plurality of passages for supplying fluid from the passage in the hub to the said trough, whereby gas under pressure may be directed over the trough to reduce the fluid to a finely divided state.

4. An atomizing device comprising a pressure chamber having an opening therein, a sleeve in the chamber, a conduit in the sleeve extending substantially into the said opening, means in the chamber for positioning the conduit centrally in the said opening, a fluid nozzle on the conduit extending over the said opening and adapted to cooperate therewith to form an annular gas outlet, packing material between the sleeve and the conduit, a gland member to hold the packing in position, and a disc on the feed pipe having a sleeve portion thereon adapted to be threaded into the said gland member for moving the said conduit longitudinally, whereby the dimensions of the said gas outlet may be adjusted.

5. An atomizing device comprising a pressure chamber having an opening therein, a sleeve in the chamber, a conduit in the sleeve extending substantially into the said opening, means in the chamber for positioning the conduit centrally in the said opening, a fluid nozzle on the conduit extending over the said opening and adapted to cooperate therewith to form an annular gas outlet, packing material between the sleeve and the conduit, a gland member to hold the packing in position, a disc on the conduit having a sleeve portion thereon adapted to be threaded into the said gland member for moving the conduit longitudinally to adjust the width of the said gas outlet and a pointer on the pressure chamber adapted to register with graduations on the said disc for indicating the dimensions of the said gas outlet.

6. An atomizing device comprising a nozzle having a trough in an upper surface portion thereof immediately adjacent the edge thereof, a conduit supporting said nozzle and communicating with said trough to deliver fluid through the nozzle into the bottom of the trough, gas receiving means enclosing said conduit and having an opening adjacent the nozzle for delivering gas across said upper surface portion of the nozzle to atomize the fluid in said trough and means on the conduit for moving said conduit vertically with respect to the gas receiving means whereby the dimensions of said opening may be adjusted while maintaining said opening immediately adjacent the said trough.

7. An atomizing device comprising means for receiving a flow of gas, a nozzle having a substantially horizontal upper surface cooperating therewith to form means for directing the flow of gas radially from the atomizer and across said upper surface, an arcuate trough in the plane surface immediately adjacent the edge thereof, means for positioning said nozzle to maintain said trough thereon immediately adjacent the gas directing means, and a passage for supplying fluid to be atomized to the trough to form a rising column of fluid substantially perpendicular to the flow of gas, whereby the fluid is atomized in a highly dispersed condition.

8. An atomizing device comprising a pressure chamber, means for supplying gas to the chamber, a conduit extending through the pressure chamber, means for supplying fluid to be atomized to the conduit, a nozzle on the conduit having a substantially horizontal upper surface formed with an annular trough immediately adjacent the periphery thereof, said nozzle and said chamber cooperating to form an aperture immediately adjacent the said trough for directing the gas as a stream outwardly across the said upper surface, and a passageway between the conduit and the trough for causing the fluid to be released as a rising annular column substantially perpendicular to the gas stream whereby the fluid may be atomized in a highly dispersed condition.

9. An atomizing device comprising a pressure chamber, means for supplying gas to the pressure chamber, a nozzle having a substantially horizontal upper surface cooperating with said chamber to form means for directing a current of gas radially from the atomizer and across the said upper surface, a conduit on the nozzle extending through the chamber, means for supplying a fluid to be atomized to the conduit, an annular trough in the upper surface immediately adjacent the edge thereof, said trough being positioned outwardly of and immediately adjacent to the gas directing means, a passageway between the conduit and the trough for providing a flow of fluid to the trough, said flow into the trough being perpendicular to the upper surface and causing a rising annular column of fluid to meet the stream of air at substantially a 90 degree angle, whereby the fluid is atomized in a highly dispersed condition.

WILLIAM SPENCER BOWEN.